(12) United States Patent
Jo

(10) Patent No.: US 12,278,356 B2
(45) Date of Patent: Apr. 15, 2025

(54) BATTERY MODULE AND BATTERY PACK INCLUDING THE SAME

(71) Applicant: LG ENERGY SOLUTION, LTD., Seoul (KR)

(72) Inventor: Woosik Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 758 days.

(21) Appl. No.: 17/312,152

(22) PCT Filed: May 8, 2020

(86) PCT No.: PCT/KR2020/006082
§ 371 (c)(1),
(2) Date: Jun. 9, 2021

(87) PCT Pub. No.: WO2020/231095
PCT Pub. Date: Nov. 19, 2020

(65) Prior Publication Data
US 2022/0045386 A1    Feb. 10, 2022

(30) Foreign Application Priority Data

May 14, 2019  (KR) .................. 10-2019-0056449

(51) Int. Cl.
*H01M 10/6551*   (2014.01)
*H01M 10/625*   (2014.01)
(Continued)

(52) U.S. Cl.
CPC ..... *H01M 10/6551* (2015.04); *H01M 10/625* (2015.04); *H01M 10/6556* (2015.04); *H01M 50/19* (2021.01); *H01M 50/204* (2021.01); *H01M 50/209* (2021.01); *H01M 50/242* (2021.01); *H01M 50/3425* (2021.01); *H01M 2220/20* (2013.01)

(58) Field of Classification Search
CPC ........... H01M 10/6551; H01M 10/625; H01M 10/6556; H01M 50/209; H01M 50/242; H01M 50/3425; H01M 50/204; H01M 50/19; H01M 2220/20
See application file for complete search history.

(56) References Cited

U.S. PATENT DOCUMENTS 6,521,024 B1    2/2003  Akahori et al.
9,806,325 B2   10/2017  Woehrle et al.
(Continued)

FOREIGN PATENT DOCUMENTS

CN       1996640 A    7/2007
CN     104064692 A    9/2014
(Continued)

OTHER PUBLICATIONS

Extended European Search Report for European Application No. 20805087.2, dated Dec. 20, 2021.
(Continued)

*Primary Examiner* — James Lee
(74) *Attorney, Agent, or Firm* — Birch, Stewart, Kolasch & Birch, LLP

(57) ABSTRACT

A battery module includes a battery cell stack in which a plurality of battery cells are stacked, and a heat sink located on one side of the battery cell stack, wherein the heat sink includes a cooling pipe, at least one rupture part, and a sealing material layer.

15 Claims, 8 Drawing Sheets

(51) Int. Cl.
*H01M 10/6556* (2014.01)
*H01M 50/19* (2021.01)
*H01M 50/204* (2021.01)
*H01M 50/209* (2021.01)
*H01M 50/242* (2021.01)
*H01M 50/342* (2021.01)

(56) References Cited

U.S. PATENT DOCUMENTS

| | | |
|---|---|---|
| 2007/0164711 A1 | 7/2007 | Kim et al. |
| 2011/0287285 A1 | 11/2011 | Yoon |
| 2012/0231304 A1 | 9/2012 | Kaiser et al. |
| 2014/0017525 A1 | 1/2014 | Schaefer |
| 2014/0072855 A1 | 3/2014 | Schaefer |
| 2014/0170447 A1 | 6/2014 | Woehrle et al. |
| 2014/0175124 A1 | 6/2014 | Nathan |
| 2016/0043368 A1 | 2/2016 | Kim |
| 2016/0134000 A1 | 5/2016 | Lee et al. |
| 2017/0165513 A1 | 6/2017 | Li |
| 2018/0191038 A1 | 7/2018 | Li et al. |
| 2018/0248160 A1 | 8/2018 | Lee |
| 2023/0060668 A1 | 3/2023 | Motokawa et al. |

FOREIGN PATENT DOCUMENTS

| | | |
|---|---|---|
| CN | 108028334 A | 5/2018 |
| CN | 109643776 A | 4/2019 |
| CN | 109888728 A | 4/2019 |
| DE | 10 2011 075 318 A1 | 11/2012 |
| EP | 1 806 807 A1 | 7/2007 |
| EP | 2991134 A1 | 3/2016 |
| EP | 3306737 A1 | 4/2018 |
| EP | 3 340 337 A1 | 6/2018 |
| JP | 6-88047 U | 12/1994 |
| JP | 7-272751 A | 10/1995 |
| JP | 2012-252909 A | 12/2012 |
| JP | 2014-511552 A | 5/2014 |
| JP | 2017-512359 A | 5/2017 |
| KR | 10-2011-0128639 A | 11/2011 |
| KR | 10-2012-0065346 A | 6/2012 |
| KR | 10-2014-0005236 A | 1/2014 |
| KR | 10-2014-008323 A | 1/2014 |
| KR | 10-2016-0019251 A | 2/2016 |
| KR | 10-2016-0140478 A | 12/2016 |
| KR | 10-2017-0021122 A | 2/2017 |
| KR | 10-2017-0081582 A | 6/2017 |
| KR | 10-2017-0135476 A | 12/2017 |

OTHER PUBLICATIONS

International Search Report (PCT/ISA/2010) issued in PCT/KR2020/006082, dated Aug. 27, 2020.

BATTERY MODULE AND BATTERY PACK INCLUDING THE SAME

TECHNICAL FIELD

Cross Citation with Related Application(s)

This application claims the benefit of Korean Patent Application No. 10-2019-0056449 filed on May 14, 2019 with the Korean Intellectual Property Office, the disclosure of which is incorporated herein by reference in its entirety.

The present disclosure relates to a battery module and a battery pack including the same, and more particularly, to a battery module for solving stability problems caused by chain reaction by high temperature heat, and a battery pack including the same.

BACKGROUND ART

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

A battery pack for use in electric vehicles has a structure in which a plurality of cell assemblies, each including a plurality of unit cells, are connected in series to obtain a high output. In addition, the unit cell can be repeatedly charged and discharged by electrochemical reactions between components, which include a positive electrode current collector, a negative electrode current collector, a separator, an active material, an electrolyte and the like.

Meanwhile, recently, as the need for a large capacity structure is increasing along with the utilization as an energy storage source, there is a growing demand for a battery pack with a multi-module structure in which a plurality of battery modules, each including a plurality of secondary batteries connected in series and/or in parallel, are integrated.

Meanwhile, when a plurality of battery cells are connected in series/parallel to configure a battery pack, it is common to configure a battery module composed of at least one battery cell first, and then configure a battery pack by using at least one of the battery modules and adding other components.

Since the secondary battery contains various kinds of combustible materials, there is a possibility of danger in that the secondary battery may overheat or explode due to overcharge, overcurrent or other external physical impact. Thus, the secondary battery has a major drawback in safety. Therefore, in the case of a battery module or battery pack including a large number of such secondary batteries, a battery management system (BMS) may be used to safely and efficiently manage the battery.

However, despite this method, a fire may occur inside the battery pack due to external impact, abnormal operation of internal battery cells, or control failure by BMS. If a fire occurs in a battery cell inside the battery pack and affects adjacent battery cells and fires occurs in series, human life and property damage can be significant. Therefore, there is a need to structurally develop a technique for the safety device.

DETAILED DESCRIPTION OF THE INVENTION

Technical Problem

It is an object of the present disclosure to provide a battery module that makes full use of the space between cooling channels to prevent chain actions due to high-temperature and high-pressure gas ejection from battery cells, and a battery pack including the battery module.

However, the problem to be solved by embodiments of the present disclosure is not limited to the above-described problems, and can be variously expanded within the scope of the technical idea included in the present disclosure.

Technical Solution

A battery module according to one embodiment of the present disclosure comprises a battery cell stack in which a plurality of battery cells are stacked in a first direction, and a heat sink located on one side of the battery cell stack, wherein the heat sink includes a cooling pipe, at least one rupture part, and a sealing material layer.

The at least one rupture part includes a first rupture part and a second rupture part, and the first rupture part may be located at a first end of the heat sink, and the second rupture part may be located at a second end of the heat sink.

The at least one rupture part includes a first rupture part and a second rupture part, the heat sink extends long in a second direction perpendicular to the first direction between a first end and a second end, the first rupture part is located at the first end of the heat sink, and the second rupture part may be located at the second end of the heat sink.

The heat sink includes at least one protruding part protruding toward the battery cell stack, an ejection hole is formed in the protruding part, and the sealing material formed in the sealing material layer may extend into the ejection hole.

The first rupture part and the second rupture part may be formed at an end of the protruding part.

The battery module may further include a resin layer located between the heat sink and the battery cell stack.

The resin layer may be formed of a plurality of layers spaced apart from each other, and the protruding part may be located between the plurality of resin layers.

The battery module further includes a compression pad located between the plurality of battery cells, and the compression pad may be located to correspond to the protruding part.

Each of the first rupture part and the second rupture part may have a dome shape, the dome shape of the first rupture part and the dome shape of the second rupture part may protrude in different directions with respect to the bottom surface of the heat sink.

The sealing material layer is continuously formed from the first rupture part to the second rupture part, and the cross-sectional area of the sealing material layer may become gradually wider from the first rupture part to the second rupture part.

The first rupture part has a dome shape protruding downward with respect to the bottom surface of the heat sink, and the second rupture part may have a dome shape protruding upward with respect to the bottom surface of the heat sink.

The battery module may further include a third rupture part located on an upper surface of the heat sink.

The first rupture part is broken as the internal pressure of the battery cell stack increases, the second rupture part is broken while the generated internal pressure pushes out the sealing material located in the sealing material layer, and gas may be ejected while the third rupture part is broken by internal pressure caused by the gas.

The sealing material layer may include a fire extinguishing gel or an insulating oil.

A battery pack according to another embodiment of the present disclosure includes the above-mentioned battery module.

Advantageous Effects

According to the embodiments, when gas is ejected in the battery cell due to fire, the rupture part is broken by an increase in internal pressure resulting therefrom. The battery cell sealing material is ejected through the rupture part and high-temperature heat is blocked, so that a chain reaction can be prevented.

Further, by forming an additional rupture part on the outer surface of the heat sink, the possibility of explosion due to the generation of a large amount of gas caused by a series of ignition of the battery by the high temperature gas can be reduced.

In addition, the heat sink is not only a device simply for cooling, but also includes a safety device, so that the space can be utilized in a compact manner.

DETAILED DESCRIPTION OF THE EMBODIMENTS

Figure 1:
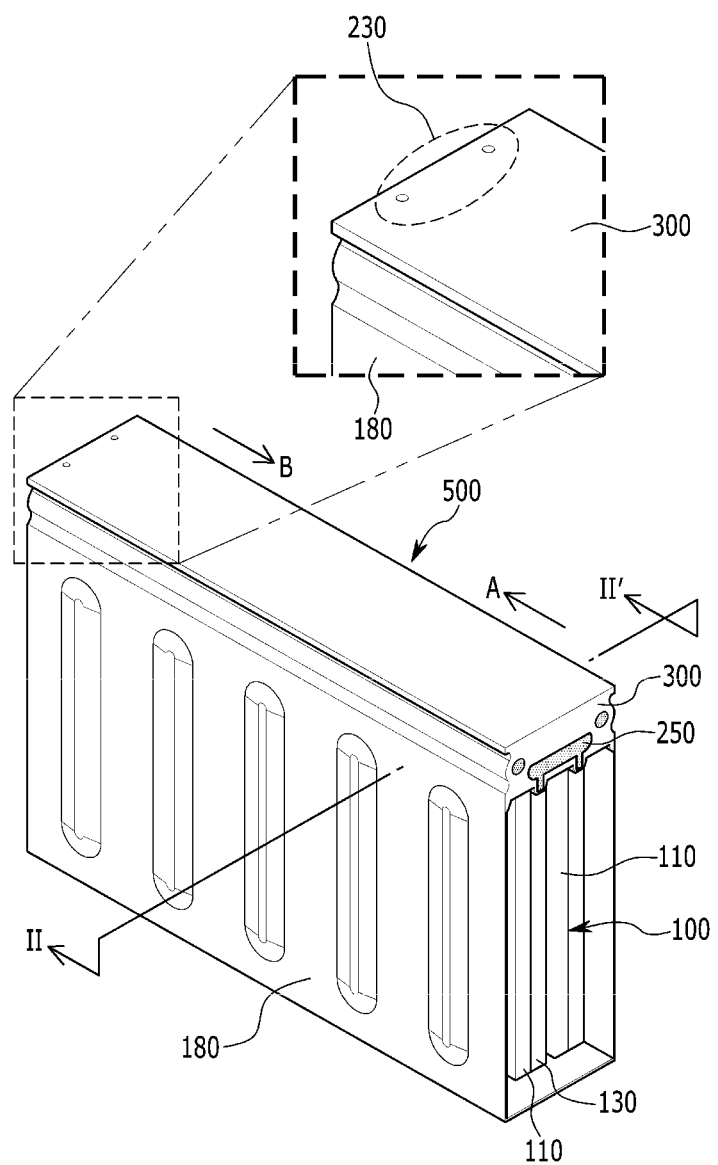
FIG. 1 is a perspective view showing a battery module according to an embodiment of the present disclosure.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 2:
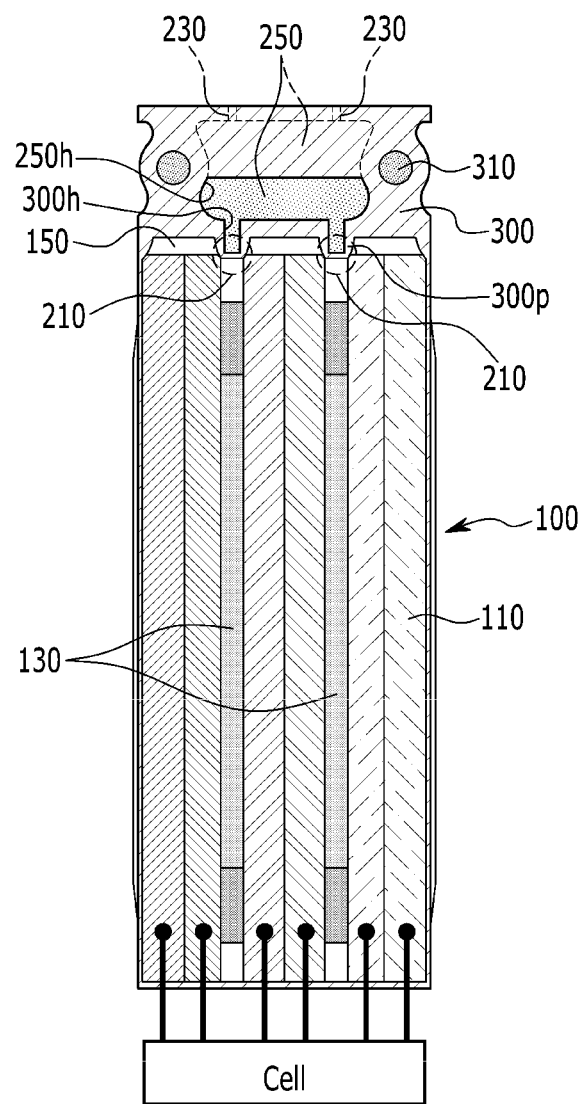
FIG. 2 is a cross-sectional view taken along line II-II' in FIG. 1.

FIG. 1 is a perspective view showing a battery module according to an embodiment of the present disclosure. FIG. 2 is a cross-sectional view taken along line II-II' in FIG. 1.

Referring to FIG. 1 and FIG. 2, the battery module according to the present embodiment includes a battery cell stack 100 in which a plurality of battery cells 110 are stacked in one direction, a heat sink 300 located on one side of the battery cell stack 100, and a side plate 180 adjacent to the battery cell 110 located at the outermost side in the stacking direction of the battery cell stack 100. The heat sink 300 is located on the upper part of the battery cell stack 100, and may extend long along one side of the battery cell 110 rather than a portion connected to the electrode lead (not shown). Although not shown, the end plates may be coupled in the direction A and B of FIG. 1.

The heat sink 300 according to the present embodiment includes a cooling pipe 310, one or more rupture parts 210 and 230, and a sealing material layer 250. The sealing material layer 250 may include a fire extinguishing gel or an insulating oil. As the fire extinguishing gel or the insulating oil, a liquid that can prevent an internal short circuit in the secondary battery, can dissipate high temperature heat, and can seal the peripheral portion of the battery cell 110 can be used.

Referring to FIG. 2, the battery cell stack 100 may further include a compression pad 130 formed between the plurality of battery cells 110. The compression pad 130 may have a function of absorbing a volume change according to a characteristic in which the battery cell 110 expands/contracts according to a state of charge, and a dimensional tolerance of the battery cell itself. A resin layer 150 may be located between the battery cell stack 100 and the heat sink 300. The resin layer 150 may transfer heat generated in the battery cell stack 100 to the heat sink 300. Thereafter, heat is transferred to a cooling pipe 310 through which the cooling water flows, so that the heat generated in the battery cell stack 100 may be cooled. The cooling pipe 310 may extend in a bar shape in a direction perpendicular to the stacking direction of the battery cell stack 100. The resin layer 150 may be form in a plurality of layers spaced apart from each other, and a protruding part 300p may be located between the plurality of resin layers 150 formed. The protruding part 300p may be located to correspond to the compression pad 130.

In the heat sink 300 according to the present embodiment, a sealing material layer 250 made of a sealing material is formed therein, and a cooling pipe 310 through which cooling water passes is formed around the sealing material layer 250. The heat sink 300 may extend long in a direction perpendicular to the stacking direction of the battery cell stack 100. The sealing material layer 250 may form a hole 250h extending long inside the heat sink 300, and may be formed by filling the hole 250h with a sealing material.

At least one protruding part 300p protruding in a direction at which the battery cell stack 100 is located may be formed at a lower end of the heat sink 300. The protruding part 300p is a structure in which a part of the heat sink 300 protrudes toward the battery cell stack 100, and can be integrally formed with the heat sink 300. An ejection hole 300h is formed in the protruding part 300p, and the sealing material formed in the sealing material layer 250 may be extended and filled in the ejection hole 300h. In other words, the ejection hole 300h may extend to the hole 250h in which the sealing material layer 250 is formed, and the sealing material filled in the ejection hole 300h may be connected to the sealing material layer 250.

Hereinafter, the rupture part according to the present embodiment will be described in detail with reference to FIGS. 3 and 4.

Figure 3:
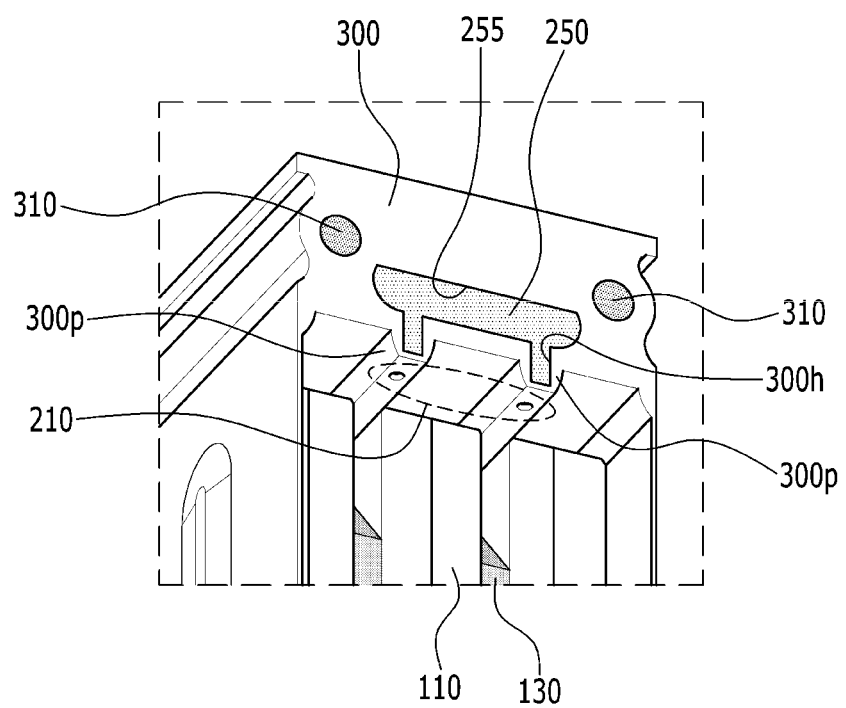
FIG. 3 is a perspective view of the battery module according to an embodiment of the present disclosure as viewed in the direction A of FIG. 1.
Figure 4:
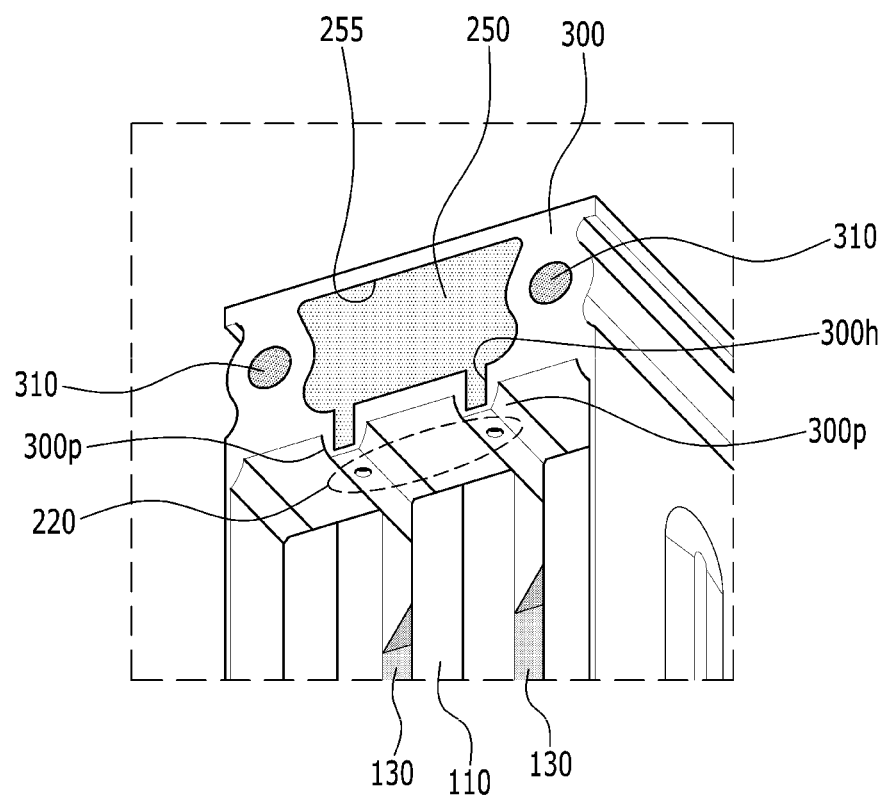
FIG. 4 is a perspective view of a battery module according to an embodiment of the present disclosure as viewed in the direction B of FIG. 1.

FIG. 3 is a perspective view of the battery module according to an embodiment of the present disclosure as viewed in the direction A of FIG. 1. FIG. 4 is a perspective view of a battery module according to an embodiment of the present disclosure as viewed in the direction B of FIG. 1.

Referring to FIG. 3, the rupture part according to the present embodiment may be made of at least one part. For example, the first rupture part 210 may be formed into two parts so as to be spaced apart along a direction in which the plurality of battery cells 110 are stacked. The first rupture part 210 may be located at one end of the heat sink 300. The rupture part according to the present embodiment may, in addition to the first rupture part 210, include a second rupture part 220 as shown in FIG. 4. The second rupture part 220 may be located at the other end of the heat sink 300 so as to correspond to one end of the heat sink 300 at which the first rupture part 210 is located. Specifically, when the heat sink 300 extends long in a direction perpendicular to the stacking direction of the battery cell stack 100, the first rupture part 210 is located at one end in the direction in which the heat sink 300 extends, and the second rupture part 220 may be located at the other end in the direction in which the heat sink 300 extends.

The first rupture part 210 and the second rupture part 220 according to the present embodiment may be formed at the ends of the protruding part 300p which is a structure in which a part of the heat sink 300 is formed so as to project toward the battery cell stack 100. An ejection hole 300h filled with a sealing material is formed inside the end of the protruding part 300p. In this case, the first rupture part 210 and the second rupture part 220 may have a dome shape or a valve shape protruding in mutually different directions with respect to the bottom surface of the heat sink 300. The battery module according to the present embodiment has the structure as described above, whereby when gas is generated due to a fire in the battery cell 110, the internal pressure increases and thus, the first rupture part 210 and the second rupture part 220 are broken, so that the sealing material of the sealing material layer 250 is ejected to shut off the battery cell 110. That is, it is possible to prevent chain actions by blocking transfer of high-temperature heat to the other battery cells 110 adjacent to the battery cell 110 in which the fire has occurred.

Figure 5:
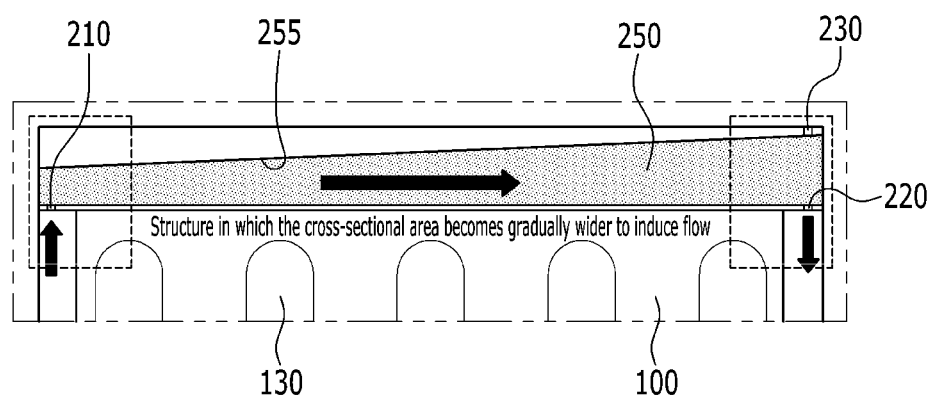
FIG. 5 is a cross-sectional view of a battery module according to an exemplary embodiment of the present disclosure, taken along a direction B of FIG. 1 and cross a space filled with a battery cell sealing material.

FIG. 5 is a cross-sectional view of a battery module according to an exemplary embodiment of the present disclosure, taken along a direction B of FIG. 1 and across a space filled with a battery cell sealing material.

Referring to FIG. 5, the sealing material layer 250 according to the present embodiment is continuously formed from the first rupture part 210 to the second rupture part 220, and the cross-sectional area of the sealing material layer 250 may become gradually wider from the first rupture part 210 to the second rupture part 220. Here, the cross-sectional area of the sealing material layer 250 may represent a portion cut in a plane perpendicular to the stacking direction of the battery cell stack 100. As described above, in order to break the first rupture part 210 and the second rupture part 220 and eject the sealing material of the sealing material layer 250 to shut off the battery cell 110, when the first rupture part 210 is broken along with the increase of the internal pressure, the sealing material forming the sealing material layer 250 is pushed out, the internal pressure of the sealing material layer 250 increases, and thus, the second rupture part 220 is broken. At this time, in order to have a directivity in which the sealing material of the sealing material layer 250 is ejected, the rupture parts 210 and 220 have preferably a dome shape protruding in mutually different directions with respect to the bottom surface of the heat sink 300. Since the rupture parts 210 and 220 have a directivity in which they are destroyed in a dome shape, the first rupture part 210 has a dome shape protruding downward with respect to the bottom surface of the heat sink 300, and the second rupture part 220 may have a dome shape protruding upward with respect to the bottom surface of the heat sink 300, based on an inverted dome shape. Specifically, the dome shape according to the present embodiment may be an inverted dome shape in which the directions of protrusion before and after operation are opposite, and an example of such an inverted dome type rupture part is as shown in FIG. 6.

Figure 6A:
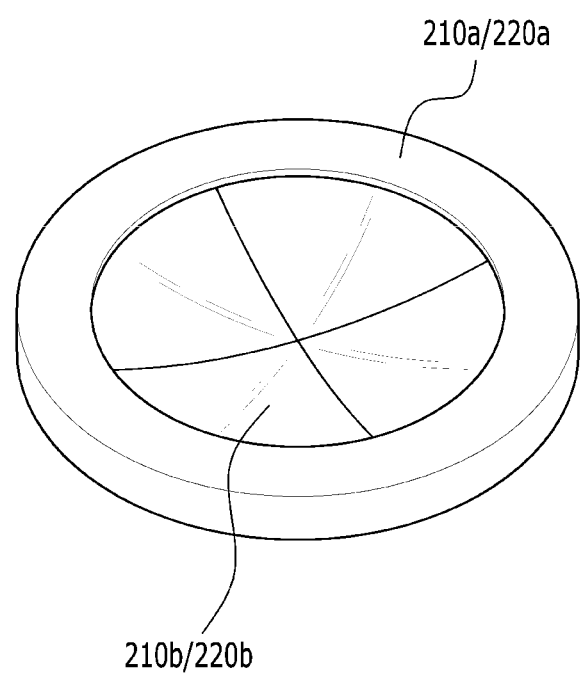
FIG. 6A shows an inverted dome type rupture part according to an embodiment of the present disclosure.

FIG. 6A shows an inverted dome type rupture part according to an embodiment of the present disclosure.

Figure 6B:
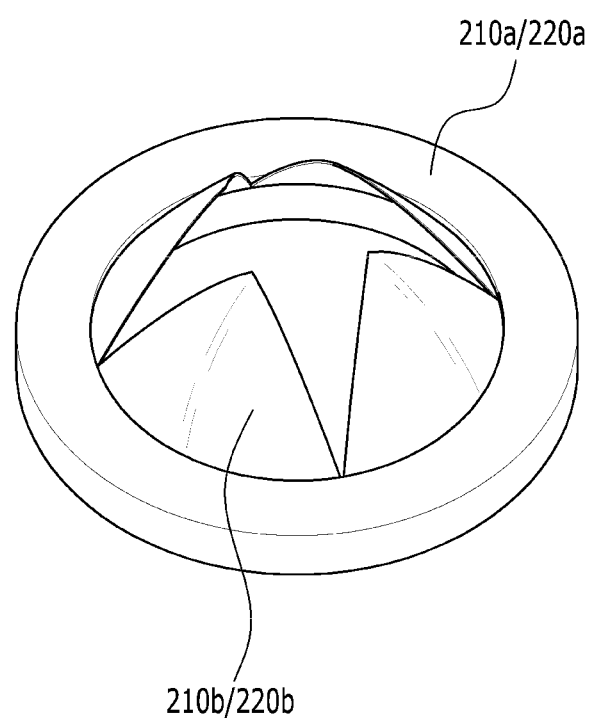
FIG. 6B shows the inverted dome type rupture part that has been ruptured.

FIG. 6A shows a state before the rupture part operates, and FIG. 6B shows a state after the rupture part operates. The rupture parts 210 and 220 according to the present embodiment described in FIG. 5 may include support parts 210a and 220a and wing parts 210b and 220b inside the support parts 210a and 220a that can be opened in response to gas generation. In a normal state, the rupture parts 210 and 220 of FIG. 5 have wing portions 210b and 220b that are closed as in FIG. 6A. When a high temperature gas is generated and a certain pressure is applied, the wing parts 210b and 220b may be torn and opened as shown in FIG. 6B.

In this way, the sealing material may be ejected into the second rupture part 220 and circulated. As described above, since the cross-sectional area of the sealing material layer 250 has a structure that becomes gradually wider from the first rupture part 210 to the second rupture part 220, the flow of the sealing material can be induced. For example, when extruding some fluids, extruding from a narrow region to a broad region requires less force, and so a structure having such a cross-sectional area is desirable.

As described above, the battery module according to the present embodiment has a structure including a first rupture part 210 and a second rupture part 220, so that the battery cell sealing material is ejected through the rupture part to block high-temperature heat. In addition to these effects, as an additional rupture part is included in addition to the rupture parts 210 and 220 described in the present embodiment, the possibility of explosion due to high pressure can be reduced. In this regard, referring to FIGS. 1, 2 and 5, the battery module may further include a third rupture part 230 located on the upper surface of the heat sink 300.

In the battery module according to the present embodiment, the first rupture part 210 is broken as the internal pressure of the battery cell stack 100 increases. The second rupture part 220 is broken while the generated internal pressure pushes out the sealing material located in the sealing material layer 250. Thereafter, the third rupture part 230 is broken by the internal pressure of the remaining gas, gas may be ejected to the outside through the rupture part 230.

Figure 7:
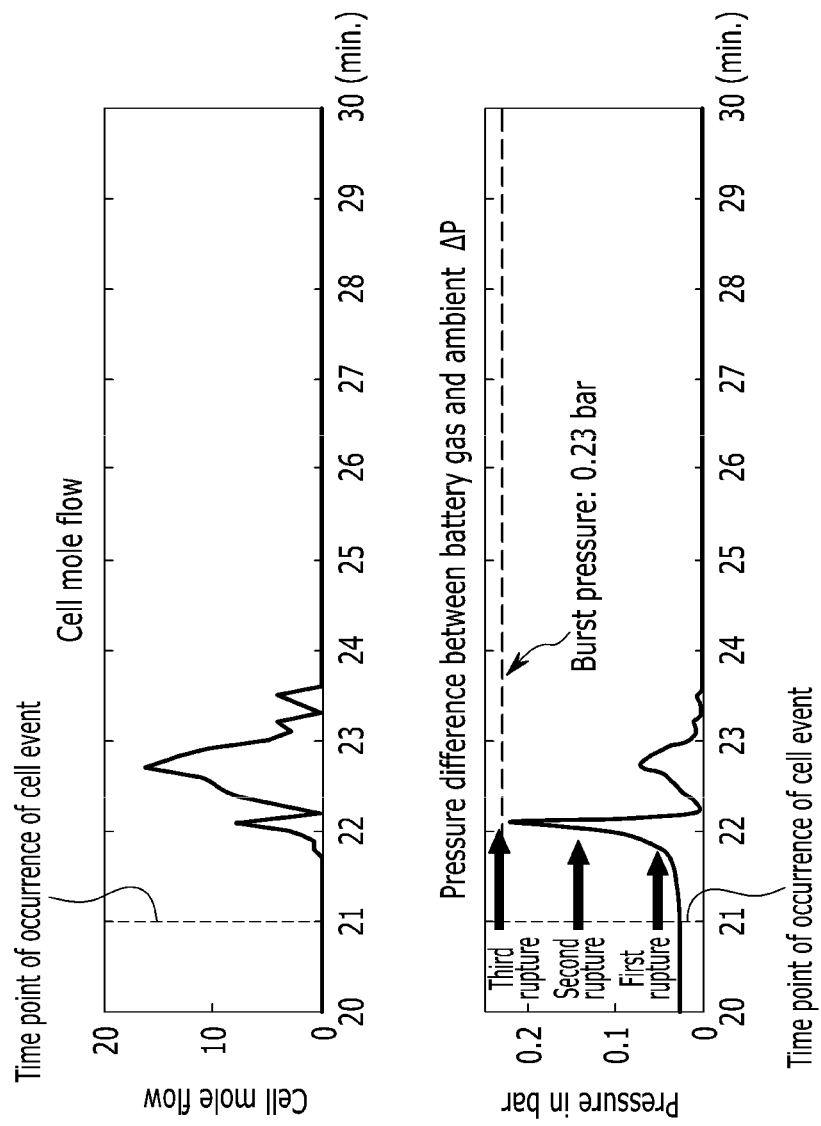
FIG. 7 is a graph showing a process in which gas is ejected as the internal pressure increases in a battery module according to an embodiment of the present disclosure.

FIG. 7 is a graph showing a process in which gas is ejected as the internal pressure increases in a battery module according to an embodiment of the present disclosure.

Referring to FIG. 7, it can be seen that as the time value (minutes) on the horizontal axis gradually increases, a first rupture occurs in the first rupture part. Thereafter, as described above, while the internal pressure generated pushes out the sealing material of the sealing material layer, a second rupture occurs at the second rupture part. After a third rupture occurs in the third rupture part due to the internal pressure of the remaining gas, it can be seen that the internal pressure of the battery cell is finally stabilized. In other words, the vertical axis in the upper graph shows the gas generation amount of the battery cell, and the vertical axis in the lower graph represents the pressure change in the battery module due to gas generation, and when a third rupture occurs, gas is ejected to the outside and the pressure inside the battery module drops.

Meanwhile, in the battery module according to an embodiment of the present invention, one or more of the battery modules may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

210, 220, 230: rupture part
250: sealing material layer
300*p*: protruding part
300: heat sink

The invention claimed is:

1. A battery module comprising:
a battery cell stack in which a plurality of battery cells are stacked in a first direction, and
a heat sink located on one side of the battery cell stack,
wherein the heat sink includes a cooling pipe, a first rupture part, a second rupture part, and a sealing material layer,
wherein the first rupture part is configured to rupture when pressure external to the heat sink exceeds a first predetermined pressure to allow flow into the heat sink,
wherein the second rupture part is configured to rupture when pressure internal to the heat sink exceeds a second predetermined pressure to allow flow out of the heat sink, and
wherein the first rupture part is broken as the internal pressure of the battery cell stack increases, and the second rupture part is broken while the internal pressure pushes out a sealing material located in the sealing material layer.

2. The battery module of claim 1, wherein the first rupture part is located at a first end of the heat sink, and the second rupture part is located at a second end of the heat sink.

3. The battery module of claim 1, wherein the heat sink extends in a second direction perpendicular to the first direction between a first end and a second end, and
wherein the first rupture part is located at the first end of the heat sink, and the second rupture part is located at the second end of the heat sink.

4. The battery module of claim 3, wherein the heat sink includes at least one protruding part protruding toward the battery cell stack,
wherein an ejection hole is formed in the at least one protruding part, and
wherein a sealing material formed in the sealing material layer extends into the ejection hole.

5. The battery module of claim 4, wherein the first rupture part and the second rupture part are formed at an end of the at least one protruding part.

6. The battery module of claim 4, further comprising a resin layer located between the heat sink and the battery cell stack.

7. The battery module of claim 6, wherein the resin layer is formed of a plurality of layers spaced apart from each other, and
wherein the at least one protruding part is located between the plurality of resin layers.

8. The battery module of claim 4, further comprising a compression pad located between the plurality of battery cells, wherein the compression pad is located to correspond to the at least one protruding part.

9. The battery module of claim 2, wherein each of the first rupture part and the second rupture part has a dome shape,
wherein the dome shape of the first rupture part and the dome shape of the second rupture part protrude in different directions with respect to the bottom surface of the heat sink.

10. The battery module of claim 2, wherein the sealing material layer is continuously formed from the first rupture part to the second rupture part, and the cross-sectional area of the sealing material layer becomes gradually wider from the first rupture part to the second rupture part.

11. The battery module of claim 10, wherein the first rupture part has a dome shape protruding downward with respect to the bottom surface of the heat sink, and the second rupture part has a dome shape protruding upward with respect to the bottom surface of the heat sink.

12. The battery module of claim 10, further comprising a third rupture part located on an upper surface of the heat sink.

13. The battery module of claim 12, wherein gas is ejected while the third rupture part is broken by internal pressure caused by the gas.

14. The battery module of claim 1, wherein the sealing material layer comprises a fire extinguishing gel or an insulating oil.

15. A battery pack comprising the battery module according to claim 1.

\* \* \* \* \*